(12) United States Patent
Lewis et al.

(10) Patent No.: US 6,422,512 B1
(45) Date of Patent: Jul. 23, 2002

(54) INFLATABLE RESTRAINT SYSTEMS FOR EJECTION SEATS

(75) Inventors: Donald J. Lewis; Terry W. Merrifield, both of Scottsdale; Steven R. Hailstone, Chandler; Steven K. Butt, Mesa; Jeffrey Allyn Baker; Shyam S. Karigiri, both of Phoenix, all of AZ (US)

(73) Assignee: Goodrich Corporation, Charlotte, NC (US)

( * ) Notice: Subject to any disclaimer, the term of this patent is extended or adjusted under 35 U.S.C. 154(b) by 4 days.

(21) Appl. No.: 09/651,477

(22) Filed: Aug. 30, 2000

Related U.S. Application Data

(60) Provisional application No. 60/151,870, filed on Aug. 31, 1999.

(51) Int. Cl.[7] .............................................. B64D 25/04

(52) U.S. Cl. ................................ 244/121; 244/122 AG; 244/122 B (58) Field of Search ................................ 244/141, 121, 244/118.5, 118.6, 122 AG; 280/728.1, 768, 769, 751; 297/464–465, 487–488

(56) References Cited

U.S. PATENT DOCUMENTS

| | | | | |
|---|---|---|---|---|
| 3,218,103 A | * | 11/1965 | Boyce | 244/122 AG |
| 3,836,168 A | * | 9/1974 | Nonaka et al. | 244/122 AG |
| 4,359,200 A | * | 11/1982 | Brevard et al. | 244/122 AG |
| 4,508,294 A | * | 4/1985 | Lorch | 244/122 AG |
| 4,592,523 A | * | 6/1986 | Herndon | 244/122 AG |
| 4,834,322 A | * | 5/1989 | Wurst | 244/122 AG |
| 4,834,420 A | * | 5/1989 | Sankrithi et al. | 280/728 |
| 4,877,202 A | * | 10/1989 | Disselkoen, Jr. et al. | 244/122 AG |
| 5,692,710 A | * | 12/1997 | Gee, Sr. | 244/121 |
| 5,947,415 A | * | 9/1999 | Werjefelt | 244/121 |
| 6,293,582 B1 | * | 9/2001 | Lewis | 244/121 |
| 6,308,917 B1 | * | 10/2001 | Ruff | 244/122 AG |
| 6,315,245 B1 | * | 11/2001 | Ruff | 244/122 AG |

* cited by examiner

Primary Examiner—Galen L. Barefoot
(74) Attorney, Agent, or Firm—Jerry J. Holden (57) ABSTRACT

An inflatable restraint system for holding and securing an aircrew member in his seat during ejection from an aircraft has one or more members forming a shield around him or her. The system is controlled to inflate after the aircrew member has started the sequence of ejection and before the rockets that power the seat from the aircraft are ignited. The forces of windblast are deflected by the inflatable restraint from the aircrew member as the aircrew member enters into and remains in the windblast and in his seat.

18 Claims, 8 Drawing Sheets

INFLATABLE RESTRAINT SYSTEMS FOR EJECTION SEATS

CROSS REFERENCE TO RELATED PROVISIONAL APPLICATION

This non-provisional application claims the filing date of Provisional Application having Ser. No. 60/151,870 filed on Aug. 31, 1999, titled "Inflatable Restraint Systems for Ejection Seats".

FIELD OF INVENTION

This invention relates to aircrew ejection seats in general and more particularly to inflatable devices for securing the aircrew member safely in his seat during ejection.

BACKGROUND OF THE INVENTION

Of major concern when a fighter aircraft is disabled in the air, is ejecting the crewmembers safely. In fighter aircraft, the air crewmembers initiate the process of ejection by pulling on an ejection handle, squeezing an ejection handle or some similar device to initiate ejection. The canopy that encloses the air crewmembers inside the aircraft cockpit is first blown or cut away. Next, the seat ejects out of the aircraft by a ballistic catapult along guide rails and the seat and air crewmember sitting thereon begins to enter the windblast. After the seat separates from the guide rails, it is propelled clear of the aircraft by rocket motors. When the seat reaches a safe trajectory, a parachute deploys for returning the air crewmember to the earth. The seat is stripped from the aircrew member and falls back to earth.

The proper positioning of the aircrew member in his seat is necessary for a safe ejection from the aircraft. Such a positioning requires that the aircrew member is correctly aligned in his seat and that his arms and legs are safety stowed. Many factors affect positioning such as the altitude and attitude of the aircraft, is it flying straight, level and upright or is it in some other position?

A system identified as Inflatable Body and Head Restraint System; "IBAHRS" has been proposed which provides a pair of inflatables inside the vertical harness that extends from the five point rotary buckle to each shoulder. IBAHRS is a passive system that automatically tightens the harness at the onset of the ejection. The inflatable pretensions the straps and forces the occupant back against the seat. This action lessens the chances of the aircrew member from striking cockpit objects during the emergency.

However in fixed wing aircraft, there is a system that uses a net-like device that comes out from the seat to keep the arms and maybe the legs close to the body. In this way, when the aircrew member clears the aircraft, the air blast or windblast will not cause his limbs to flail. Around the ankles of the aircrew member are "garter-like" restraints that tethered to the seat. During normal flying, the aircrew member's legs are free to move around, but during ejection, the tethers are pulled tight pulling the legs against the seat. Later when the aircrew member is ready to leave the seat, the tethers are cut and the legs are no longer secured to the seat.

The location of the ejection handle if is between the aircrew member's legs, is designed so that as the aircrew member pulls the handle, this forces his arms up and in toward the center of his body. When the ejection handles are on the arm rests; the squeezing of the handles tends to keep the aircrew member's arms in position along his body.

U.S. Pat. No. 4,508,294 issued to Lorch on Apr. 2, 1985 and entitled "Air Bag Restraint System" teaches an air bag member which is deployed from a stored position frontally to the chest of the aircrew member. The air bag member is guided upward and downward along tracks on either side of the seat so that the upper body of the aircrew member is enclosed within the seat just before ejection. In this patent, it is mention that windblasts are up to 1600 pounds per square foot, about 11 pounds per square inch. This force greets the aircrew member as he clears the aircraft.

U.S. Pat. No. 4,436,262 describes a windblast head protector for use during the aircrew's ejection from the aircraft. U.S. Pat. No. 4,465,250 describes a flight suit that has means on the suit into which the aircrew member snaps a hook. The hook and flight suit means function to restrain the legs against the seat during ejection.

SUMMARY OF THE INVENTION

It is a principal advantage of the present invention to position an aircrew member in his ejection seat before the ejection seat starts moving out of the aircraft.

It is yet another advantage of the present invention to ensure that an aircrew member is securely position during ejection to avoid or reduce injury to the crewmember.

It is yet another advantage of the present invention to provide inflatables in an ejection seat that are inflated in concert with the start of the ejection sequence to center the aircrew member in the ejection seat and maintaining the proper center of gravity of the seat.

It is still another advantage of the present invention to provide spine and body stiffening to the aircrew member by inflatables stowed in the ejection seat.

These and other advantages are found in an inflatable restraint system for protecting an aircrew member during ejection having a central L-shaped tubular member with the vertical arm of the "L" extending from the ankles. The vertical arm extends in front of the legs to above the knees and the horizontal arm of the "L" extends toward the chest of the aircrew member. At least one pair of tubular members extends from either side of the central tubular member and extends along the aircraft seat. The pair of tubular members is in fluid communication with the central tubular member.

A tubular manifold member is secured to the vertical arm of the "L" shaped central tubular member and is positioned between the ankles and the knees of the aircrew member. The manifold member is positioned between the central tubular member and the aircraft seat and is in fluid communication with the central tubular member. The manifold member has an inflation inlet.

A sheet member is connected to the central tubular member and the pair of tubular members. The sheet member is connected to the least one pair of tubular members and is operable to enclose the arms and the legs of the aircrew member before entering the windblast during ejection. A source of inflating fluid connected to the inflation inlet and is operable upon command to inflate the tubular members and with the sheet member pulled taut, to form a shield around the aircrew member in the aircraft seat.

BRIEF DESCRIPTION OF THE DRAWINGS

These and other advantages will become apparent from the detailed description and the following drawings in which.

DETAILED DESCRIPTION OF THE PREFERRED EMBODIMENTS

Figure 1:
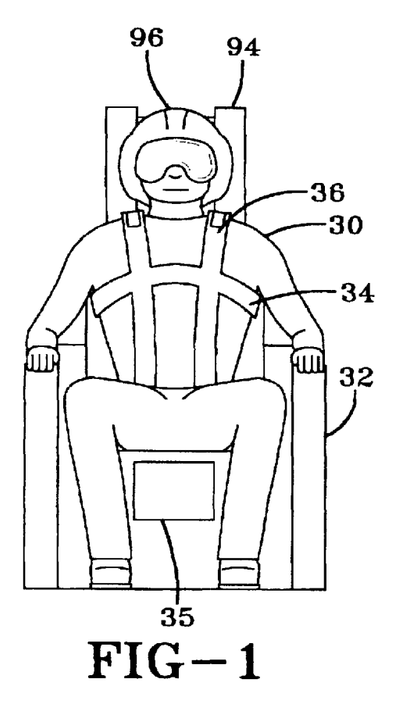
FIG. 1 is front view of an aircrew member in an ejection seat.
Figure 2:
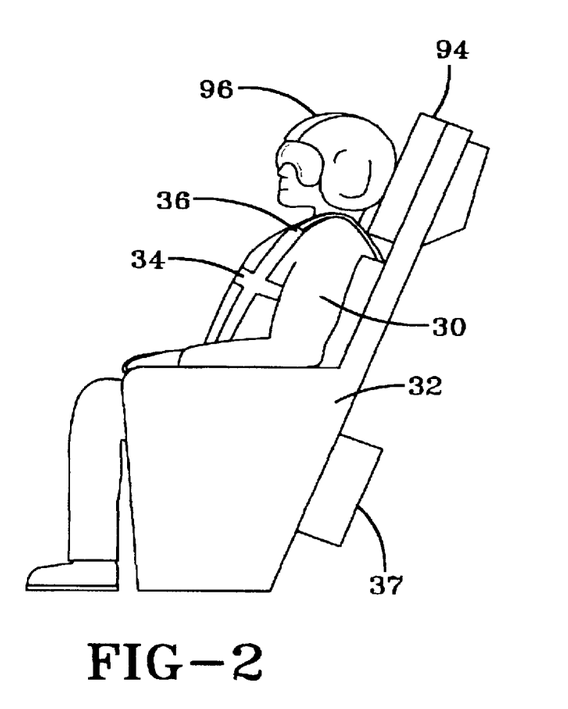
FIG. 2 is a side view of FIG. 1.

Referring to FIG. 1 there is illustrated a crewmember 30 in an aircraft seat 32. In this FIG., the crewmember 30 is secured to the seat 32 by various belts and harnesses such as chest harness 34 and shoulder harness 36, collectively hereinafter called harnesses. It is the function of such harnesses to keep the crewmember 30 in the seat 32 and to prevent him/her from hitting the various equipment and aircraft structure in the cockpit during normal flying maneuvers. The harnesses 34, 36 allow the crewmember to freely move his body while operating the aircraft to control the movement thereof.

When the crew member 30 has to be ejected from the aircraft due to the aircraft having a failure in one or more of its mechanisms such that the aircraft can not fly, the crew member 30 pulls on the ejection handle, not shown, or some other ejection device. From that moment on, the restraint system that is folded in a frangible container 35 located on the front of the seat 32 is deployed by the ejection control systems 37, to prepare him to be ejected from the aircraft. The canopy is removed, and various propelling devices such as rockets move the seat 32 along one or more rails and out of the aircraft. After clearing the aircraft, the parachutes deploy and the crewmember 30 is separated from his seat 32 to descend safely to the ground.

Figure 3:
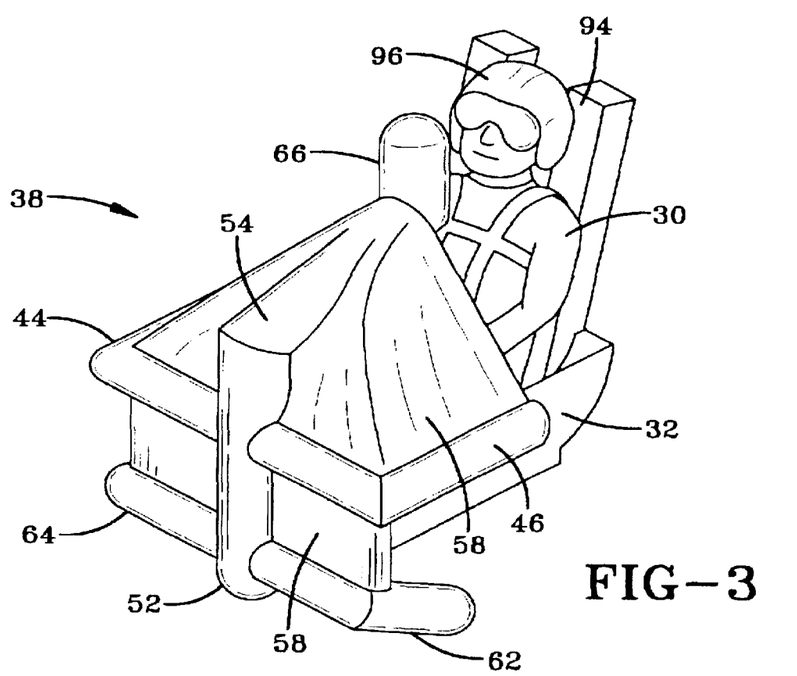
FIG. 3 is an isometric view of the inflatable of a preferred embodiment of restraint system with an aircrew member in the seat.
Figure 4:
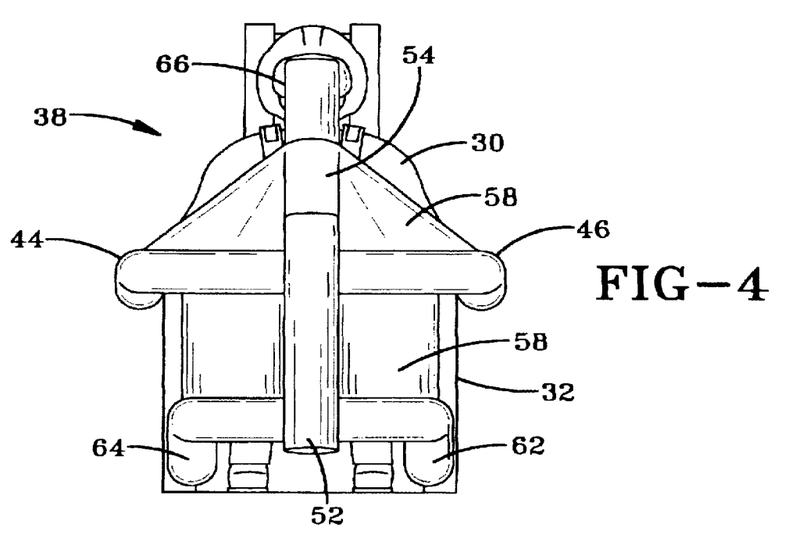
FIG. 4 is a front view of FIG. 3.
Figure 5:
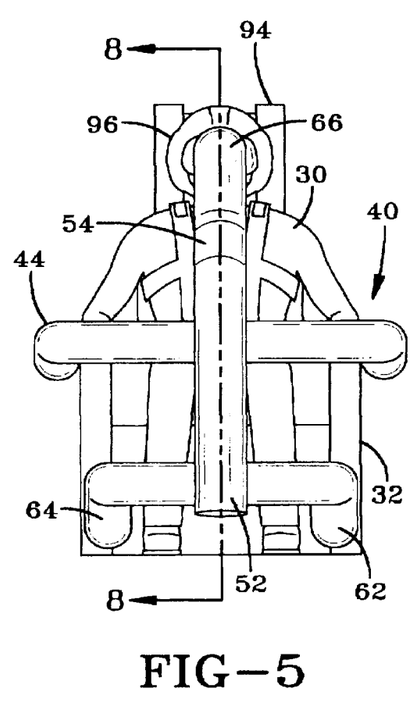
FIG. 5 is a front view the inflatable's structure of FIG. 3 parts removed.

The preferred embodiment of an inflatable restraint system 38 for protecting an aircrew member in the aircraft seat during ejection from the aircraft is illustrated in FIG. 3 and FIG. 4 with the internal structure 40 illustrated in FIGS. 5–10. The system has a central L-shaped tubular member 42, at least one pair of tubular members 44, 46, a tubular manifold member 48, and an inlet 50 for receiving inflating fluid.

The central L-shaped tubular member 42 has a substantially vertical arm 52 and a horizontal arm 54. The vertical arm 52 extends from approximately the ankles of the aircrew member 30 and in front of the aircrew member's legs to a point approximate his knees. The horizontal arm 54 is substantially normal to the vertical arm 52 and extends over the aircrew member's lap toward the aircrew member's chest. The horizontal member 54 does not extend to or touch the face or helmet of the aircrew member 30.

At least one pair of tubular members 44, 46 extend from the central tubular member 42. The pair 44, 46 typically extend in a substantially orthogonal direction from the side of the central tubular member 42 to a position outward of the arm of the aircraft seat 32. The tubular members may also extend downward to the aircrew member's feet.

At this point, the tubular members 44, 46 are shaped to be orthogonal to the central tubular member 52 and extend along the aircraft seat. The purpose of the at least one pair of tubular members 44, 46 is to overlap the aircrew member's arm on the seat 32 and to extend along the aircrew member's legs and alongside of the seat. The pair of tubular members 44, 46 are in fluid communication with the central tubular member 42.

Figure 6:
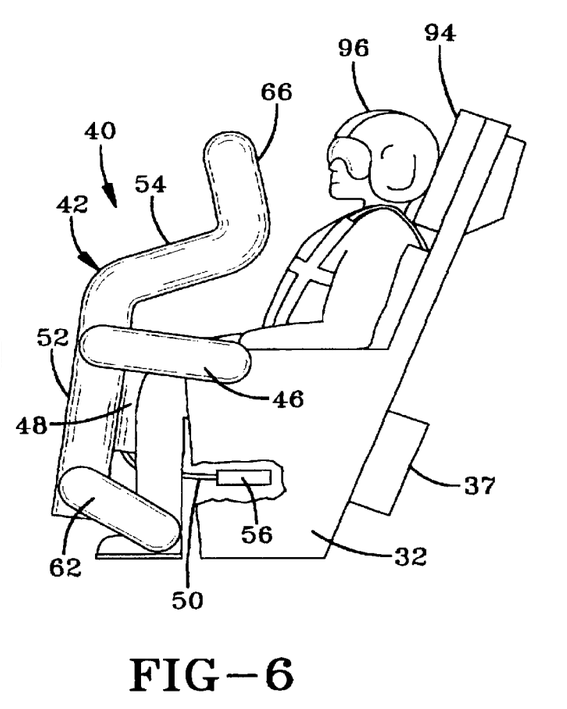
FIG. 6 is a side view of FIG. 5.
Figure 7:
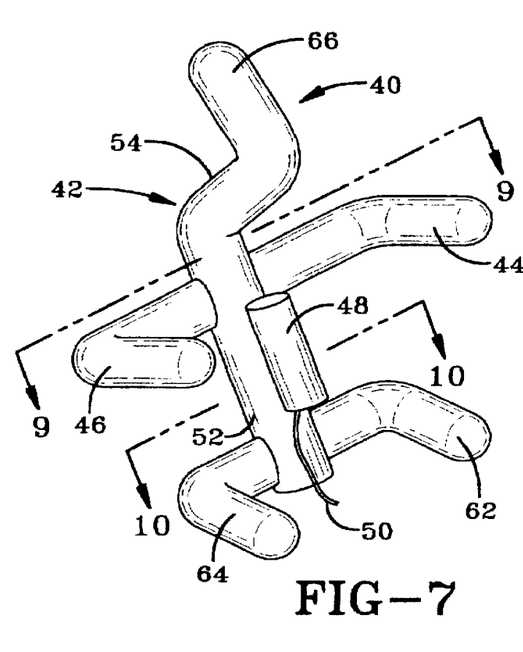
FIG. 7 is an isometric view of the inflatable's structure of FIG. 5.
Figure 8:
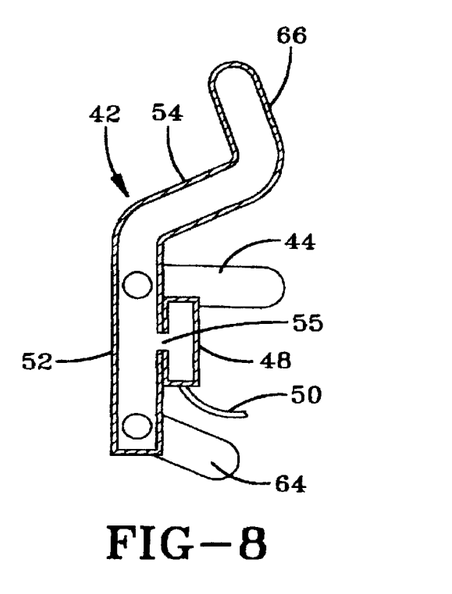
FIG. 8 is a sectional view taken along line 8—8 of FIG. 5.
Figure 9:
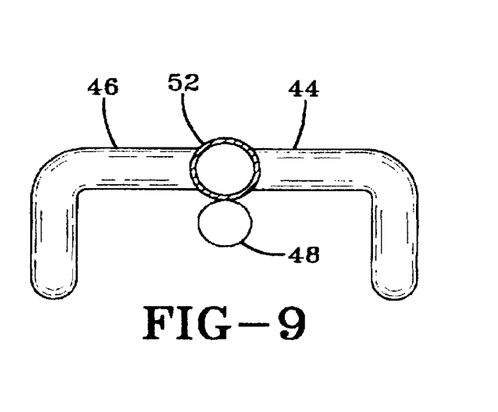
FIG. 9 is a sectional view taken along line 9—9 of FIG. 7.
Figure 10:
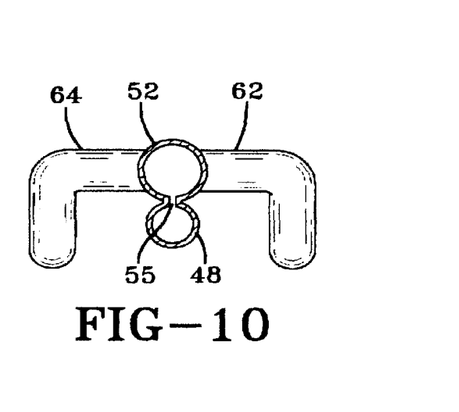
FIG. 10 is a sectional view taken along line 10—10 of FIG. 7.

A tubular manifold member 48 is secured to the vertical arm 52 of the "L" shaped central tubular member 42. The manifold member 48 is positioned between the ankles and the knees of the aircrew member 30 and between the central tubular member 42 and the aircraft seat 32. The manifold member 48 is positioned to keep the central tubular member 42 and the at least one pair of tubular members 44, 46 positioned to be in front of the aircrew member 30 as shown in FIG. 6. With the central tubular member 42 positioned in front of the aircrew member 30, the at least one pair of tubular members 44, 46 are both in front of the aircrew member 30. The manifold member 48 is in fluid communication with the central tubular member 42 by means of an orifice 55 as illustrated in FIGS. 8 and 10. In addition, as illustrated in FIG. 7, the manifold has an inflation inlet or tube 50 that is connected to a source of inflating fluid 56.

As illustrated in FIGS. 3 and 4, a sheet member 58 is connected to the central tubular member 42 and to each one of the pair of tubular members 44, 46. The sheet member 58 is operable to enclose the arms and the legs of the aircrew member 30 before the aircrew member enters the windblast during ejection. The sheet member 58 may be netting having a plurality of holes therein to create wind turbulence around the aircrew member 30.

The actual timing of inflation is under control of the ejection seat controls 37 of the aircraft seat 32 and the design of the inflatable restraint system. During the seat ejection operation, a source of inflating fluid or inflator 56 is activated and supplies inflating fluid to the inflation inlet 50 of the manifold member 48. The inflating fluid flows into the manifold 48 and from there to the central tubular member 42 causing the L-shaped member to inflate. At some predetermined time after beginning of inflation the remaining tubular members 44, 46 will inflate and position the sheet member 58 forming a shield around the aircrew member 30 and the aircraft seat 32 as illustrated in FIGS. 3 and 4.

In an alternate embodiment to the preferred embodiment, as more fully illustrated in FIGS. 3–8, a second pair of tubular members 62, 64 is added to the central tubular member 42. This second pair of members 62, 64 is essentially parallel to the first pair of members 44, 46 and extends from either side of the central tubular member 42. When both pair of tubular members 44, 46, 64, 66 are present, one of the pairs 44, 46 is operable to extend along the aircraft seat 32 in front of and along the arms of the aircrew member 30. This is to restrain the aircrew member's arms on the armrests of the seat 32. The other pair 64, 66 of tubular members is operable to extend in front of and along the sides of the legs of the aircrew member 30. This is to restrain the aircrew member's feet and legs against the front of the seat 32. This prevents the feet and legs from to bending along the sides of the seat either during ejection from the aircraft or because of the force of the windblast.

With both pairs of inflatable tubular members present, the sheet member 58 is connected not only to the central tubular member 42 but also to each one 44, 46, 64, 66 of the pairs of tubular members. As the tubular members inflate, the sheet member 58 is drawn taut across the aircrew member essentially providing a shield across the aircrew member 30 and seat 32 deflecting the windblast from the aircrew member 30 during ejection.

Another modification to the restraint system of FIG. 3 is a transversely extending tubular member 66 extending away from the horizontal arm 42 as illustrated in FIGS. 6–8. This member 66 is connected at the end of the horizontal arm 54 and extends in front of the head of the aircrew member 30. This member 66 is inflated along with the horizontal arm 54 and operates to deflect the windblast from the helmet or head of the aircrew member as the seat is being ejected. When the head of the aircrew member 30 first clears the front of the aircraft, the windblast is very forceful as attempts to push against the helmet. With this transversely extending member 66, the windblast is deflected away from the helmet.

The preferred embodiment of the present invention operates to protect the aircrew member 30 during the ejection. Several inflatables are identified and are inflated to protect the aircrew member. The period of ejection is typically less than seventy milliseconds from the time of initiation. In about two hundred or more milliseconds, generally less than five hundred milliseconds, the aircrew member 30 is in the windblast.

Figure 11:
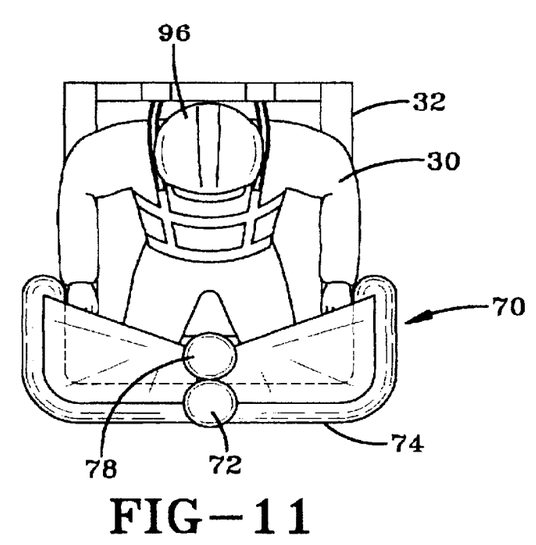
FIG. 11 is a top view of another embodiment.
Figure 12:
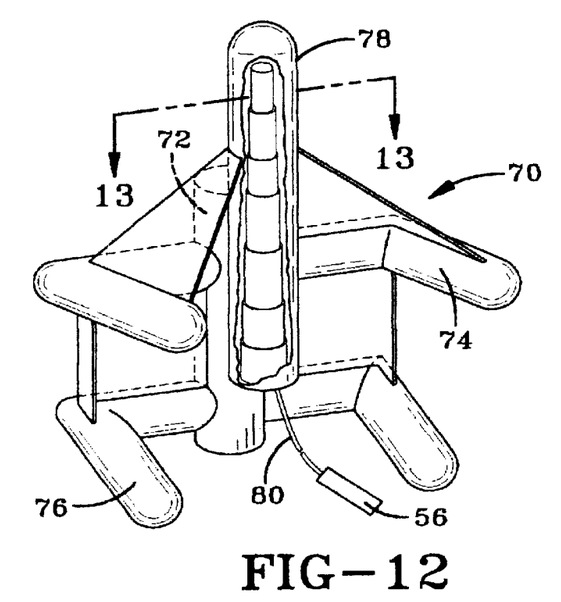
FIG. 12 is an isometric view of the structure of FIG. 11.
Figure 13:
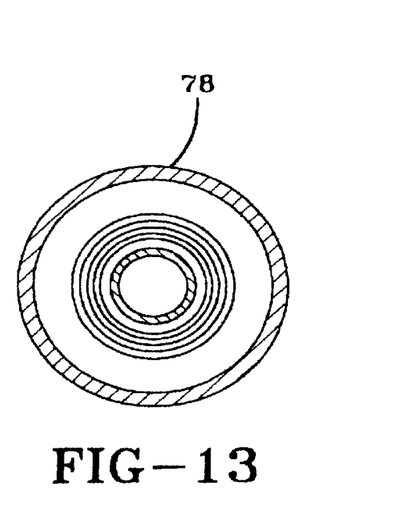
FIG. 13 is a sectional view along line 13—13 of FIG. 12.

A second embodiment 70 of an inflatable restraint system for protecting an aircrew member 30 is illustrated in FIGS. 11–13. In this embodiment 70, a first inflatable member 72 is position away from the seat of the aircrew member in a vertical position. Second 74 and third 76 inflatable members extend orthogonal from the first inflatable member and across the front of the aircrew member and the aircrew member's seat 32 and along the sides of the seat 32. A manifold member 78 is position between the first member 72 and the seat 32. The manifold member 78 is in fluid communication with the first member 72 and has an inflating fluid inlet 80. A mast member 82 is positioned in the manifold 78 and upon inflation becomes a rigid member that extends from the below the seat to above the chest to deflect the windblast when the aircrew member is in the windblast.

The mast 82, first 72, second 74 and the third 76 inflatable members are normally folded and stored in a frangible container in the front of the seat of the aircrew member. This position is typically located between the aircrew member's legs and against the front of the seat 32.

An inflator is connected to the manifold member and is operative to supply an inflating gas to extend the mast vertically in front of the aircrew member. A screen member, which may be a perforated member or a net, is connected to each of the tubular members forming a shield. In one embodiment, the mast member is a telescopic member as illustrated in FIGS. 12 and 13 that is positioned in the manifold. A screen member is connected to the manifold, 78, the first 72, second 74 and third 76 inflatable members as illustrated in FIGS. 11 and 12.

The mast, the inflatables and the screen member upon inflation form an inflated member across the front of the aircrew member forming a shield to the windblast. The mast and the inflatables become rigid members when inflated and the screen member becomes taut.

The inflation pressure of the inflator is less than thirty-five psi and is typically between fifteen and twenty psi. The windscreen pressure is approximately eleven psi.

To ensure the proper positioning of the various inflatable members there may be internal tethers interconnecting the second and third inflatable members to the first inflatable member. These tethers are for locating the inflatable members orthogonal to the mast member 58.

In each of the embodiments, the inflatable restraint member 70 is fully inflated within three hundred milliseconds from the initial actuation of the inflator 56. The material of inflatable restraint systems is less than 810 denier, normally 420 denier, urethane coated material.

Figure 14:
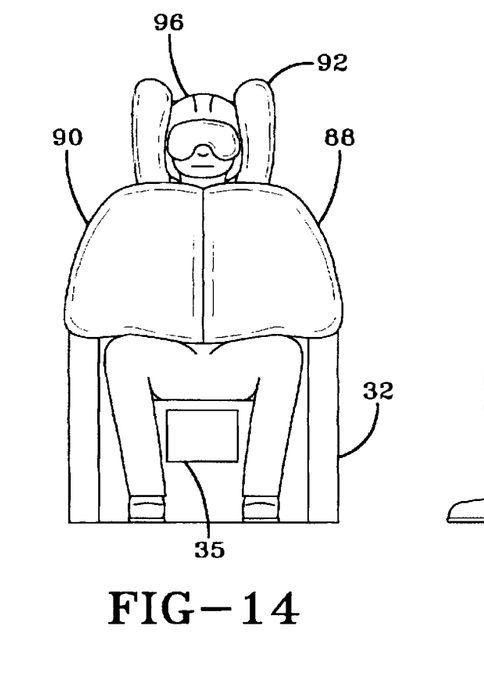
FIG. 14 is a front view of another embodiment of an upper body inflatable windblast shield.
Figure 15:
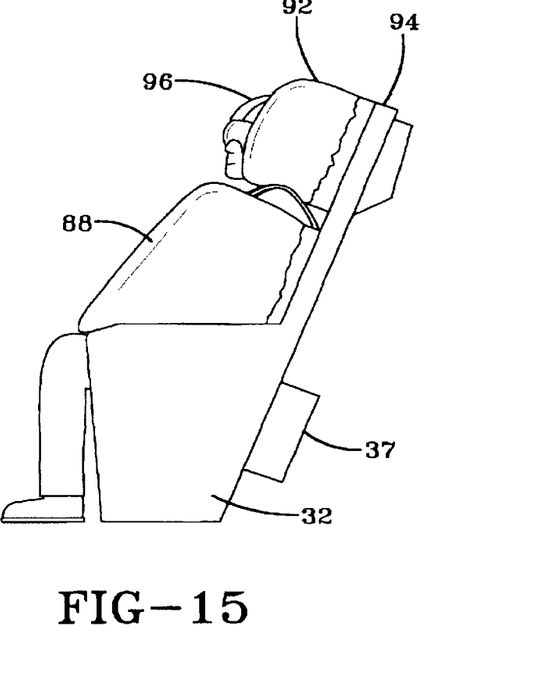
FIG. 15 is a side view of FIG. 14.
Figure 16:
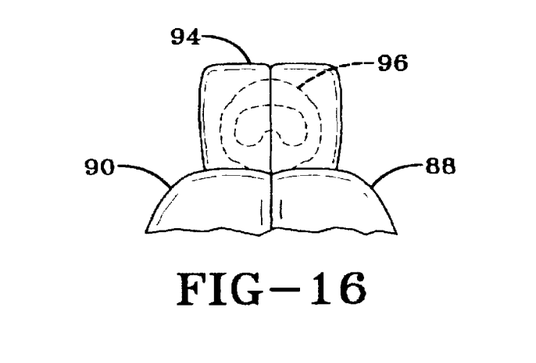
FIG. 16 is a partial view of a modification of FIG. 14

FIGS. 14–16 illustrate another embodiment of the invention. In this embodiment there is a pair of inflatables 88, 90 positioned in the seat 32. When inflated these inflatables apply a force against the aircrew member 30 centering and holding the aircrew member 30 in the seat 32. In addition when simultaneously inflated, these pair of inflatables 88, 90 operate to enclose and lift the aircrew member 30 a predetermined distance from the seat 32. The purpose of this lifting is to relieve any compression forces on the spine of the aircrew member 30. This is spinal compression and happens due to the forces on the aircrew member 30 during ejection.

If the crew member is a 95-percentile member or a 5-percentile crew member the inflatables will apply enough force to position the crew member. These inflatables extend over the crew member pinning his/her arms against the armrest of the seat or against the chest preventing the arms from flailing about when the windblast hits the crew member. Whether the arms are positioned on the arm rest or against the chest, is dependent upon the position of the ejection controls.

FIGS. 14–16, also illustrate an inflatable 92 that is deployed from the headrest 94. This inflatable 92 can be a single "C" shaped member or a pair of individual members, is deployed to come around each side of the helmet 96. The arms of the "C" extend around the head and helmet 96 to form a bumper to direct the head to the center of the headrest 94. In addition the pressure against the side of the head due to the inflatable functions to hold the head from moving in a lateral direction in reaction to the various deployment forces and windblast forces. During the time before aircrew member-seat separation, this inflatable 92 will prevent the head from moving away from the seat headrest 94. FIG. 16 illustrates a modification wherein the pair of individual members are formed to extend across in front of helmet 96 and extend down between the chin and the chest of the aircrew member 30.

Figure 17:
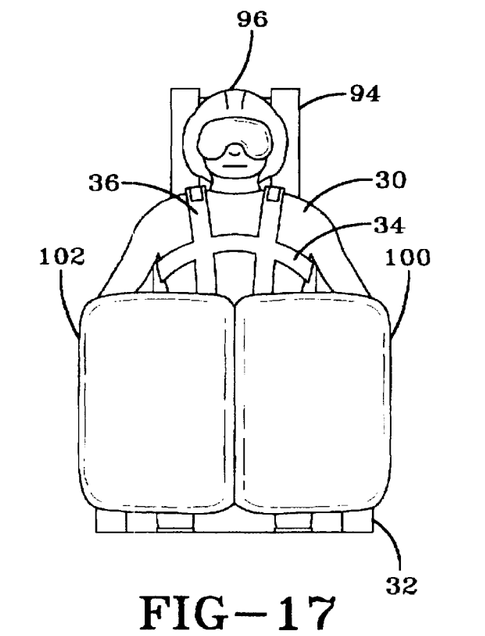
FIG. 17 is a front view of an alternate embodiment of an inflatable extending over each leg and knee.
Figure 18:
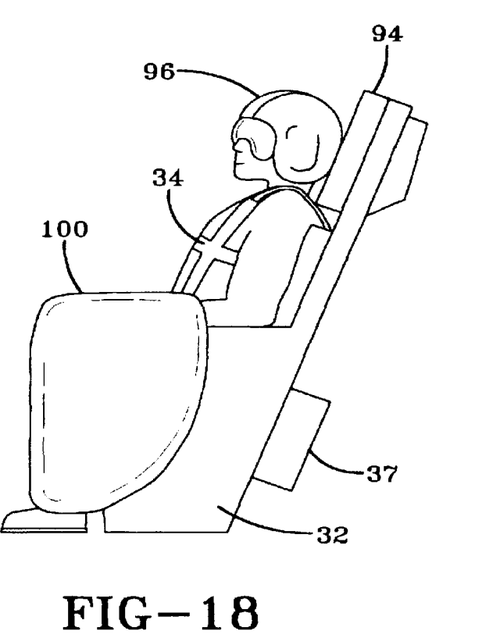
FIG. 18 is a side view of FIG. 17.

Referring to FIGS. 17 and 18, in yet another embodiment extending from the side of the seat adjacent to the thighs of the crew member 30 is another pair of inflatable members 100, 102. In this embodiment, there is one inflatable on each side of the crew member 32. These inflatables 100, 102 are so designed that they cover the thigh area of the crew member and over his/her knees. When these inflatables meet, they are under such pressure that they press the legs down against the seat and hold them in that position. In addition, the pressure inside the inflatables is such that when the two inflatables 100, 102 touch they are held together. As illustrated in FIG. 18, the inflatables can be designed to extend over the knee and down the legs to secure the legs against the front of the seat 32. In addition, these inflatables will operate to hold the hands and a portion of the arms of the aircrew member in a safe position. The inflatables of FIGS. 14–18, may in fact be constructed as an unitary structure and stored in the same frangible container in the seat. Upon inflation, these inflatables form an integral member.

Figure 19:
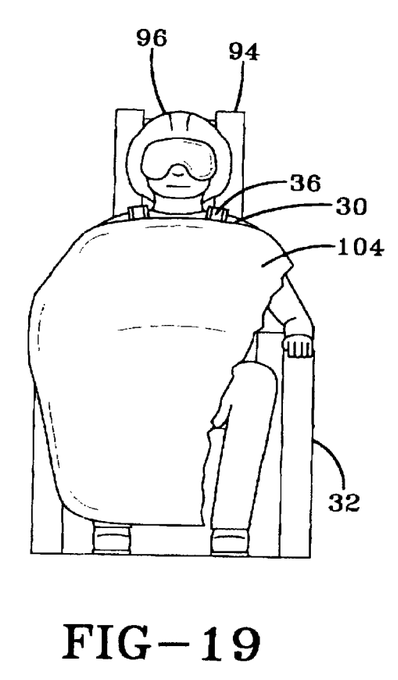
FIG. 19 is a front view of a blast shield embodiment with parts broken away.
Figure 20:
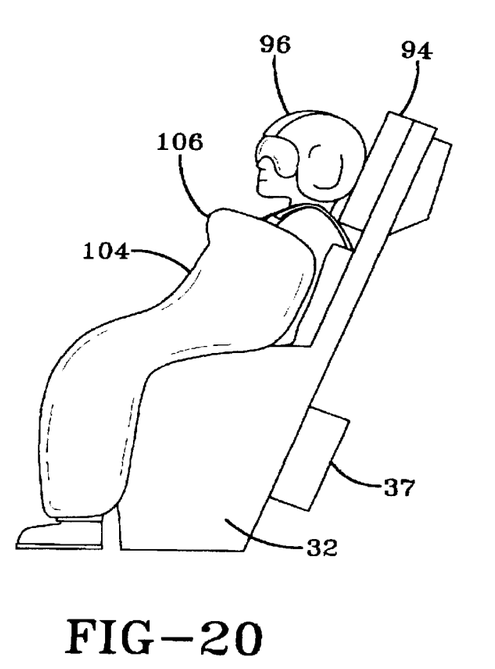
FIG. 20 is a side view of FIG. 19.

Referring to FIGS. 19 and 20 there is illustrated another system embodiment of an inflatable, identified as a full chest inflatable. This inflatable member 104 is located in a frangible container connected to the seat. This inflatable member 104 when inflated extends from a point attached to the seat proximate the aircrew member's feet to a point intermediate the chest and face of the aircrew member and envelops the arms and legs of the aircrew member 30. As in other embodiments, ejection seat controls 37 connected to or installed in the seat are adapted to be actuated by the aircrew member for ejecting the seat from the aircraft. An inflator 56 is located in or around the seat for supplying inflation fluid for inflating the inflatable 104 upon command from ejection seat controls 37. The inflatable member upon inflation bears against the feet, legs and chest of the aircrew member 30 forcing the aircrew member down in the seat and deflecting the windblast over the top of the aircrew member's face and helmet 96.

The windblast will apply a force to the slope of the full chest inflatable 104 to press against the crew member which in turn causes the crew member 30 to be pushed back and down in his seat 32. If the design requires it, this inflatable can bear against the face or the helmet 96 of the crew member and extend around the side of the helmet 96 to deflect the windblast. However, if it is a concern that the full chest inflatable 102 does not strike against the face of the crew member 32 with force during deployment, the top of the inflatable will end across the chest of the aircrew member. Along the top of the inflatable 102, a windblast deflector tubular member 106 may be positioned to deflect the windblast. If the upper portion of the inflatable 102 is permitted to lie on the helmet 96, that portion can be fabricated from a clear material in order not to interfere with the vision of the crew member 30. This inflatable 106 will hold the arms against the chest in case or on the aircraft seat 32.

An inflator 56 that can power all of the above inflatables, may be located in the inflatable or in the seat. In the alternative, another means of inflation can be a central gas generator that is mounted on or in the seat. The power to ignite the gas generator can be from a small power source connected to the inflator 56 that is powered by a very long-life battery and be completely self-contained. Other power sources can come from the aircraft itself. Using the same inflator mechanism for all the inflatables and by proper manifolding, every inflatable will inflate at a predetermined time, that may be the same or sequential.

When the crew member 30 is ready to be separated from the seat, the separation mechanism can be used to deflate the inflatables to allow the crew member 30 the opportunity to leave the aircraft seat 32. In the alternative, deflation of the inflatable can be by a time based pyrotechnic device that operates a fixed time after inflation. An example of such a device is found in U.S. Ser. No. 09/329,014 filed on Jun. 9, 1999 and entitled "Venting System for Inflatables" that is assigned to a common assignee. Other deflation techniques can be one or more fixed size openings in the inflatable that allow the gas to escape much the same as in automotive air bags.

What is being claimed is:

1. An inflatable restraint system for protecting an aircrew member during ejection from the aircraft, the system comprising:
   an aircrew member's seat mounted in an aircraft and adaptable to be ejected from the aircraft;
   a central L-shaped tubular member having the vertical arm of said "L" extending from the ankles and in front of the legs to above the knees and the horizontal arm of said "L" extending toward the chest of the aircrew member;
   at least one pair of tubular members extending from either side of said central tubular member and extending along said aircraft seat, said pair of tubular members in fluid communication with said central tubular member;
   a tubular manifold member secured to said vertical arm of said "L" shaped central tubular member and positioned between the ankles and the knees of the aircrew member and between said central tubular member and said aircraft seat, said manifold member in fluid communication with said central tubular member and having an inflation inlet;
   a sheet member connected to said central tubular member and said pair of tubular members and operable to enclose the arms and the legs of the aircrew member prior to entering into the windblast during ejection; and
   a source of inflating fluid connected to said inflation inlet and operable upon command to inflate said tubular members and along with said sheet member for forming a shield around the aircrew member and said aircrew member's seat.

2. An inflatable restraint system according to claim 1 additionally including a second pair of tubular members extending from either side of said central tubular member,
   wherein one of said first and second pair tubular members is operable to extend along said aircraft seat in front of and along the arms of the aircrew member, and
   the other of said first and second pair of tubular members is operable to extend in front of and along the sides of the legs and said aircrew member's seat.

3. An inflatable restraint system according to claim 2 wherein said sheet member is connected to each of said first and second pair of tubular members and extends from said central tubular member across said first and second tubular members forming a shield around the aircrew member and said aircrew member's seat for deflecting the windblast during ejection.

4. An inflatable restraint system according to claim 1 wherein said horizontal arm of said central L-shaped tubular member has an orthogonally extending tubular member extending away from said horizontal arm and from the helmet of the aircrew member for deflecting the windblast during ejection.

5. An inflatable restraint system according to claim 2 wherein one of said first and second tubular members extends from said central tubular member and around the foot and ankles of the aircrew member for restraining the foot and leg of the aircrew member in front of said aircrew member's seat during ejection.

6. An inflatable restraint system according to claim 5 wherein the other of said first and second tubular members extends from said central tubular member and around the hands and arms of the aircrew member for restraining the hands and arms of the aircrew member during ejection.

7. An inflatable restraint system according to claim 1 wherein said manifold member and said central L-shaped tubular member inflates prior to said at least one pair of tubular members.

8. An inflatable restraint system according to claim 7 wherein said sheet member is a perforated sheet.

9. An inflatable restraint system for protecting an aircrew member during ejection, the system comprising:

an aircrew member's seat mounted in an aircraft and adaptable to be ejected from the aircraft;

a first inflatable member adapted to be inflated;

a second inflatable member operable to extend orthogonal from said first inflatable member and then rearward along the side of said aircrew member's seat;

a third inflatable member spaced along said first member from said second member and operable to extend orthogonal from said first inflatable and then rearward along the side of said aircrew member's seat;

a frangible cover storing said first, second and third inflatable members;

an inflator connected to said first inflatable member and operative to supply an inflating gas to said inflatable members and to breakaway said frangible cover to extend said first inflatable member in front of the aircrew member from a bottom edge intermediate the knees and the feet of the aircrew member to a top edge intermediate the aircrew member's waist and shoulders and said second and third inflatable members from said first inflatable member in front of the aircrew member and along the sides of said aircrew member's seat;

said first, second and third inflatables forming an inflated unshaped member enclosing the aircrew member's seat providing a shield to the windblast when the aircrew member is ejected.

10. An inflatable restraint system according to claim 9 wherein said first, second and third inflatables are in fluid communication with said inflator.

11. An inflatable restraint system according to claim 9 additionally including a mast member connected to said first inflatable member and responsive to said inflator for rigidly extending from the bottom of said seat between the aircrew member's legs.

12. An inflatable restraint system according to claim 11 wherein said mast member is normally inflated substantially simultaneously with said first inflatable member.

13. An inflatable restraint system according to claim 9 wherein the inflation pressure of said inflator is less than thirty-five psi.

14. An inflatable restraint system according to claim 13 wherein the inflation pressure of said inflator is between fifteen and twenty-five psi.

15. An inflatable restraint system according to claim 9 wherein said first inflatable member is fully inflated within three hundred milliseconds from the initial actuation of said inflator.

16. An inflatable restraint system according to claim 11 wherein said mast is telescopically stored in said frangible cover before inflation.

17. An inflatable restraint system according to claim 11 wherein said mast and said first inflatable member are fully inflated within three hundred milliseconds from the initial actuation of said inflator.

18. An inflatable restraint system according to claim 9 wherein the material of said first, second and third inflatables is 420 denier, urethane coated material.

* * * * *